United States Patent [19]

Schulke

[11] 3,851,785
[45] Dec. 3, 1974

[54] AMPOULE CONSTRUCTION
[75] Inventor: Karl A. Schulke, Neuberg, Germany
[73] Assignee: Heraeus-Schott Quarzschmelze GmbH, Quarzstrasse, Germany
[22] Filed: Mar. 27, 1972
[21] Appl. No.: 238,219

[30] Foreign Application Priority Data
Apr. 27, 1971    Germany............................ 7116134

[52] U.S. Cl..................... 220/2.2, 206/437, 215/32
[51] Int. Cl. ............................................. H01k 1/42
[58] Field of Search ................... 215/32, 33, 35, 31;
141/31; 128/272; 220/2.1–2.3, 2.3 A, 2.3 R;
206/437

[56]         References Cited
        UNITED STATES PATENTS

| 1,995,180 | 3/1935 | Jennison et al. | 220/2.3 R |
| 2,146,579 | 2/1939 | Inman | 220/2.3 R |
| 2,320,941 | 6/1943 | Litton | 220/2.3 R |
| 2,448,476 | 8/1948 | Seegho | 220/2.3 R |
| 2,486,497 | 11/1949 | Salneu | 220/2.3 R |
| 2,490,087 | 12/1949 | Pakala | 220/2.3 R |
| 2,506,687 | 5/1950 | Scherrer | 220/2.3 R |
| 2,522,990 | 9/1950 | Cartun | 220/2.3 R |
| 2,654,041 | 9/1953 | McCurdy | 220/2.3 R |
| 2,713,754 | 7/1955 | Nixen et al. | 220/2.3 A |
| 3,100,692 | 8/1963 | Wachter | 23/254 |
| 3,391,055 | 7/1968 | Veres | 220/2.3 A |
| R21,613 | 10/1940 | Vollrath | 220/2.1 R |

FOREIGN PATENTS OR APPLICATIONS
17,478   10/1890   Great Britain ...................... 215/31

Primary Examiner—William I. Price
Assistant Examiner—Joseph Man-Fu Moy
Attorney, Agent, or Firm—Burgess, Dinklage & Sprung

[57]            ABSTRACT

An ampoule made of quartz glass, vitreous silica or similar silicatic material, especially for performing diffusion processes in semiconductors, is disclosed and has tubular barrel to accommodate a material therein. The ends of the barrel are flanged and one flanged end is closed with a cover member whose margin is irremovably placed in a gastight manner on the flanged marginal portion of the barrel. This cover member has at least one projecting tube and the other flanged end is closed off in a gastight manner by a bottom member.

4 Claims, 2 Drawing Figures

PATENTED DEC 3 1974      3,851,785
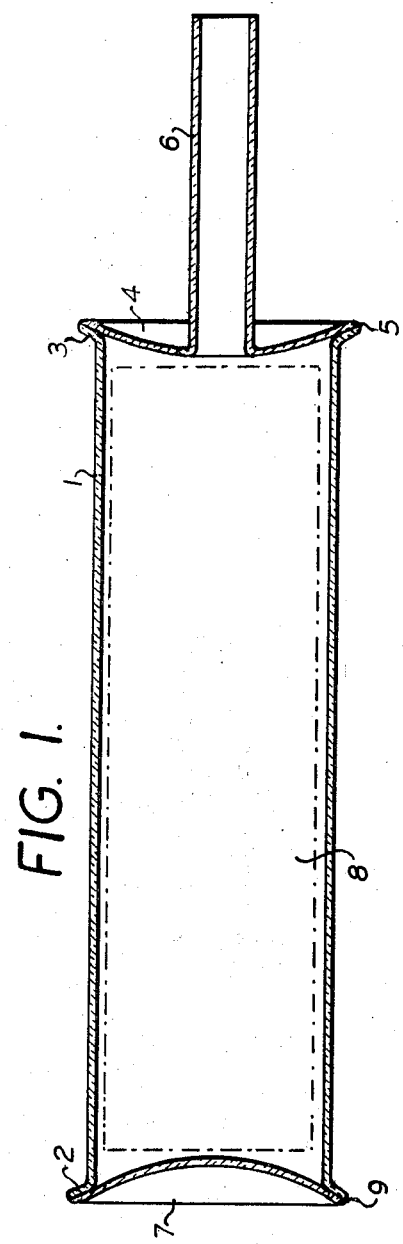
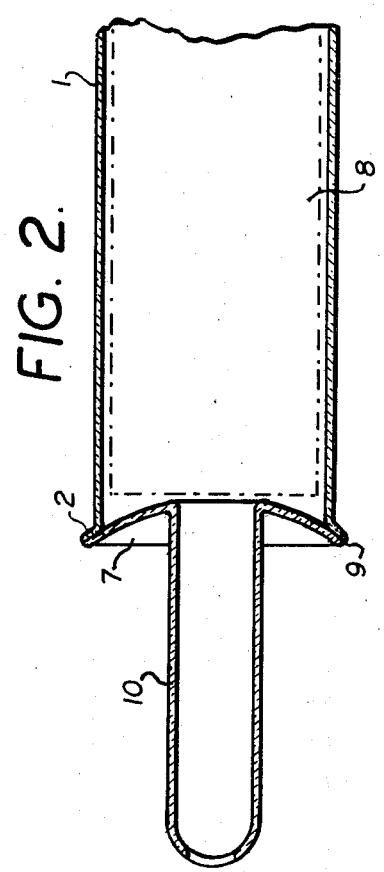
FIG. 1.
FIG. 2.

AMPOULE CONSTRUCTION

BACKGROUND

The invention relates to an ampoule of quartz glass, vitreous silica or other silicatic material, especially of the kind used in the performance of diffusion processes in the semiconductor art.

In the semiconductor art it has hitherto been the practice to use ampoules made of quartz glass for the performance of diffusion processes. These ampoules are of cylindrical construction. The one end of the ampoule terminates in a rounded bottom. The other end is closed by first filling the ampoule with the substance to be treated, then inserting a plug-like stopper of quartz glass into the ampoule and, after evacuating the interior of the ampoule, sealing it to the body of the ampoule. In these prior-art ampoules the ratio of useful space to the total length of the ampoule is unfavorable.

SUMMARY

The object of this invention is an ampoule in which the ratio of the total ampoule length to the useful space is reduced, i.e., the useful space is relatively larger for the same ampoule length.

This object is achieved by an ampoule composed of quartz glass, vitreous silica or similar silicatic material which is especially useful for performing diffusion processes in semiconductors. The ampoule has a tubular barrel to accommodate the material, and is constructed in accordance with the invention so that the ends of the barrel are flanged and one flanged end is closed with a cover whose margin is disposed in a gastight and permanent manner on the flanged marginal portion of the barrel, this cover having at least one connection tube, and the other flanged end can be sealed off in a gastight manner by a bottom member.

DESCRIPTION OF THE DRAWING

In the accompanying drawing, FIG. 1 is a longitudinal sectional view illustrating the ampoule construction of the invention and FIG. 2 is a sectional view partly broken away illustrating a preferred embodiment of the invention.

DESCRIPTION

The construction of the ampoule according to the invention has the advantage, over and above the fact that it makes a greater amount of useful space available in an ampoule of the same length as those of the prior art, that the gastight joining of the cover to the flanged margin of the barrel can be performed by welding in a simple manner, and that after the useful space has been charged with the material to be treated the bottom member can also be welded onto the other flanged end of the barrel.

In the ampoules of the prior art it was extremely difficult to perform the welding between the ampoule body and the stopper, so that the ampoules frequently broke and leaks occurred between the body of the ampoule and the stopper inserted therein.

It has proven to be advantageous to make the cover and the bottom member dish-shaped, especially concave-convex, and concave-convex shape being preferred for the cover and bottom member with the convex side facing the interior of the barrel. Such construction of the cover and bottom member results in an especially pressure-resistant ampoule.

An embodiment of the invention is represented in the drawing.

The reference number 1 generally designates the tubular barrel of the ampoule. The two ends, 2, 3, of the barrel are flanged. A cover member 4 is permanently disposed over flanged end 3 in a gastight manner. Preferably the cover member 4 and the flanged end 3 are joined by a weld 5. The cover member 4 has a tubular connection 6 which serves, for example, for the evacuation of the ampoule.

The other end 2 of the ampoule is covered by a bottom member 7. This bottom member 7 is placed on the flanged end 2 of the barrel 1 after the material represented in the drawing by the dash-dotted lines has been placed in the ampoule. Then the bottom member 7 is also joined to the end 2 of the barrel by a weld 9.

It has proven advantageous to make the cover member 4 and the bottom member 7 dish-shaped, especially concave-convex with the convex side facing the interior of the barrel 1.

This construction offers the additional advantage that the carrier bearing the semiconductor wafers, which is placed in the ampoule, is kept remote from the welds 5 and 9. Furthermore, this construction is highly pressure-resistant.

If necessary, the bottom member 7 can also be provided with a connection tube 10 (FIG. 2). A tube in which the source of the diffusion medium, for example, can be located and which can be sealed off has proven especially advantageous.

What is claimed is:

1. A diffusion ampoule for performing diffusion processes in semi-conductors having a tubular barrel, the ends of which are flanged, one of said flanged ends being closed with a cover member which is concave-convex shaped, the margin of said cover member being permanently placed in a gas-tight manner on the flanged marginal portion of the barrel, said cover member having at least one projecting tube, the other of said flanged ends being closed off in a gas-tight manner by a bottom member of concave-convex shape, said ampoule made of quartz glass.

2. A diffusion ampoule for performing diffusion processes in semi-conductors having a tubular barrel, the ends of which are flanged, one of said flanged ends being closed by a cover member whose margin is permanently placed in a gas-tight manner on the flanged marginal portion of the barrel, said cover member having at least one projecting tube, said cover member extending dome-like into said barrel, the other of said flanged ends being closed off in a gas-tight manner by a bottom member and extending dome-like into said barrel, said ampoule made of quartz glass.

3. A diffusion ampoule for performing diffusion processes in semi-conductors having a tubular barrel, the ends of which are flanged, one of said flanged ends being closed with a cover member whose margin is permanently placed in a gas-tight manner on the flanged marginal portion of the barrel, said cover member having at least one projecting tube, the other of said flanged ends being closed off in a gas-tight manner by a bottom member, said ampoule made of quartz glass and containing a carrier therein bearing a semiconductor.

4. A diffusion ampoule for performing diffusion processes in semi-conductors having a tubular barrel, the ends of which are flanged, one of said flanged ends being closed with a cover member whose margin is permanently placed in a gas-tight manner on the flanged marginal portion of the barrel, said cover member having at least one projecting tube, the other of said flanged ends being closed off in a gas-tight manner by a bottom member having a projecting tube, said ampoule made of quartz glass and containing a tube having a source of diffusion medium for use in performing diffusion in semi-conductors.

* * * * *